United States Patent
Sheen et al.

(10) Patent No.: US 7,295,847 B2
(45) Date of Patent: Nov. 13, 2007

(54) METHOD AND APPARATUS FOR PROVIDING LOCATION BASED VENDOR INFORMATION TO A WIRELESS MOBILE TERMINAL

(75) Inventors: Baoling S. Sheen, Naperville, IL (US); David S. Benco, Winfield, IL (US); Kevin J. Overend, Elmhurst, IL (US); Sandra Lynn True, St. Charles, IL (US); Kenneth J. Voight, Sugar Grove, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 198 days.

(21) Appl. No.: 11/171,790

(22) Filed: Jun. 30, 2005

(65) Prior Publication Data

US 2007/0004424 A1 Jan. 4, 2007

(51) Int. Cl.
*H04Q 7/20* (2006.01)
(52) U.S. Cl. ............... 455/456.1; 455/433; 455/435.1; 455/432.3; 455/440; 455/414.2; 455/414.3
(58) Field of Classification Search ........... 455/456.1, 455/433, 456.3, 414.1, 517, 435.1, 440, 414.2, 455/414.3, 456; 342/352.1
See application file for complete search history.

(56) References Cited

U.S. PATENT DOCUMENTS

| | | | |
|---|---|---|---|
| 6,490,456 B1 | 12/2002 | Bogdan et al. | |
| 6,650,902 B1 | 11/2003 | Richton | |
| 6,839,023 B1* | 1/2005 | Benco et al. | 342/357.1 |
| 2002/0000930 A1* | 1/2002 | Crowson et al. | 342/357.1 |
| 2002/0010000 A1* | 1/2002 | Chern et al. | 455/517 |
| 2002/0034953 A1* | 3/2002 | Tricarico | 455/456 |
| 2003/0016804 A1* | 1/2003 | Sheha et al. | 379/201.06 |
| 2003/0052815 A1* | 3/2003 | Russell et al. | 342/357.1 |

* cited by examiner

*Primary Examiner*—Joseph Feild
*Assistant Examiner*—David Q. Nguyen

(57) ABSTRACT

A method and apparatus for providing location based vendor information to a wireless mobile terminal is provided. The method includes receiving subscriber provisioned response criteria from a subscriber, receiving a request for location based vendor information from a subscriber mobile terminal, determining the location of the subscriber mobile terminal, retrieving location based vendor information for the mobile terminal's location, and sending the location based vendor information in a response satisfying the subscriber provisioned response criteria to the subscriber mobile terminal.

9 Claims, 3 Drawing Sheets

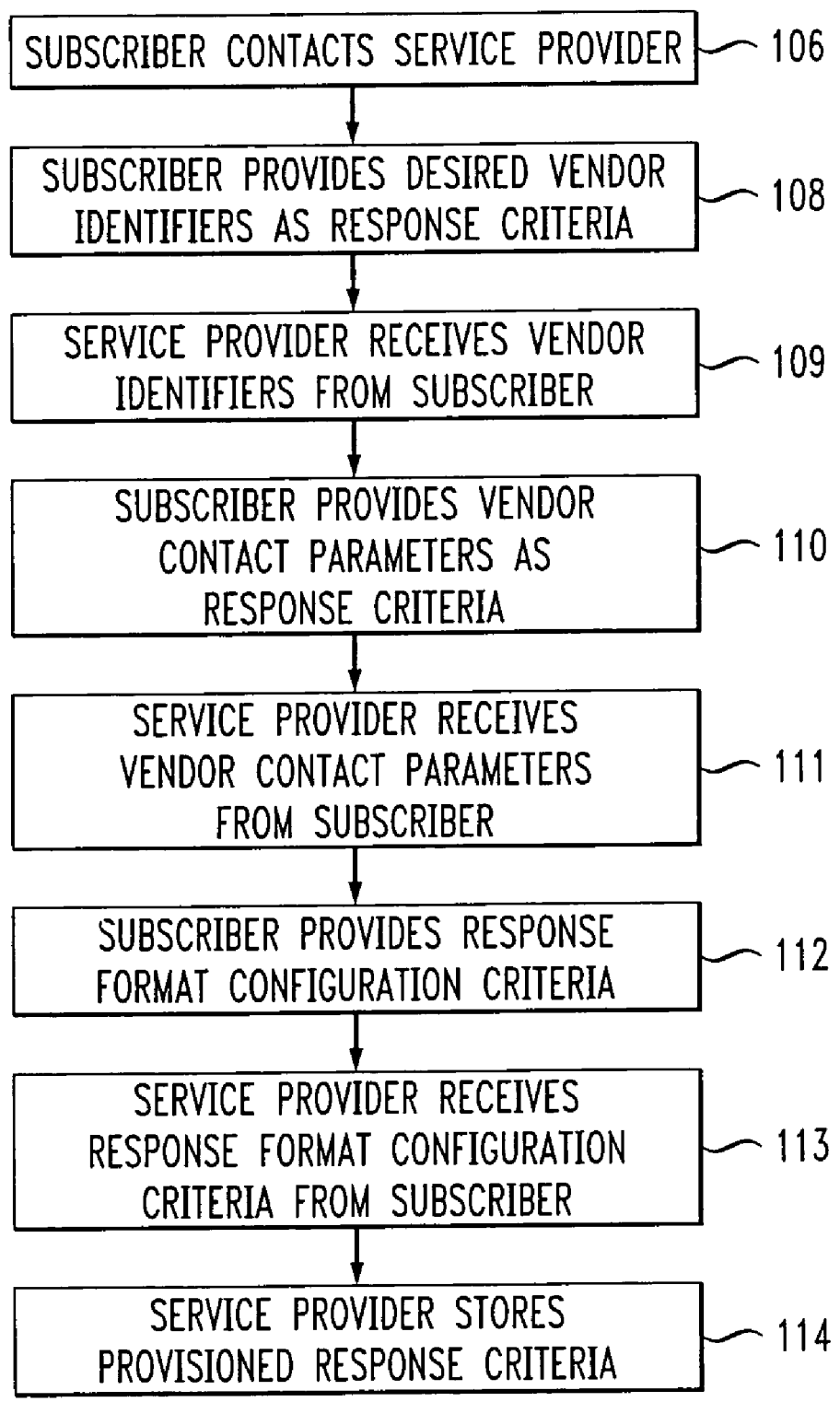

METHOD AND APPARATUS FOR PROVIDING LOCATION BASED VENDOR INFORMATION TO A WIRELESS MOBILE TERMINAL

BACKGROUND OF THE INVENTION

This invention relates to a method and apparatus for providing location based vendor information in response to a request from subscriber using a mobile terminal.

While the invention is particularly directed to the art of wireless telecommunications networks, and will be thus described with specific reference thereto, it will be appreciated that the invention may have usefulness in other fields and applications.

By way of background, wireless telecommunications have come into widespread use. Today, a large percentage of the population communicate with others using mobile terminals, also known as mobile phones, wireless phones, cellular phones, etc. Wireless telecommunications networks now provide coverage for such large areas that people can have the freedom to move about at will while still being able communicate with each other using these mobile devices.

Wireless telecommunications service providers have sought to increase the number of people who use their networks by providing a wide range of services to their customers, also known as subscribers. Mobile terminals can now send and receive data and text messages in addition to providing voice communications. These terminals can also provide geolocation information that can be used to determine the location of the terminals. For example, geolocation information is used for determining the location of mobile terminals when dialing the emergency 911 number.

Wireless telecommunications service providers are always looking for new ways to accommodate the needs of their subscribers, given the ever increasing sophistication of mobile terminals. U.S. Pat. No. 6,650,902 to Richton assigned to Lucent Technologies which is hereby incorporated herein by reference in its entirety, describes using the geolocation providing ability of mobile terminals to provide location based information to the terminal when the terminal's location satisfies a geographically based criteria. Richton teaches continually monitoring the location of mobile terminals and automatically providing them with location based information when they get near pre-defined geographic locations. However, this can create huge resource overhead problems involved with monitoring a large number of wireless terminals.

It is desirable to provide a simpler solution for providing location based information which does not require the continual monitoring of a mobile terminal's location. The present invention contemplates a new and improved that resolves the above-referenced difficulties and others.

SUMMARY OF THE INVENTION

A method and apparatus for providing location based vendor information satisfying subscriber provisioned response criteria are provided.

In one aspect of the invention the method includes receiving subscriber provisioned response criteria from a subscriber receiving a request for location based vendor information from a subscriber mobile terminal, determining the location of the subscriber mobile terminal, retrieving location based vendor information for the determined subscriber mobile terminal location, and sending location based information in a response satisfying the subscriber provisioned response criteria to the subscriber mobile terminal.

In accordance with another aspect of the invention, the system includes means for receiving subscriber provisioned response criteria from a subscriber for generating a location based vendor information response, means for receiving a request for location based vendor information from a subscriber mobile terminal, means for determining the location of the subscriber mobile terminal, means for retrieving location based vendor information for the determined subscriber mobile terminal location, and means for sending the location based vendor information in a response satisfying the subscriber provisioned response criteria to the subscriber mobile terminal.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 3 is a flow chart illustrating the formation of subscriber provisioned location based vendor information response criteria.

DETAILED DESCRIPTION OF THE PREFERRED EMBODIMENTS

Figure 1:
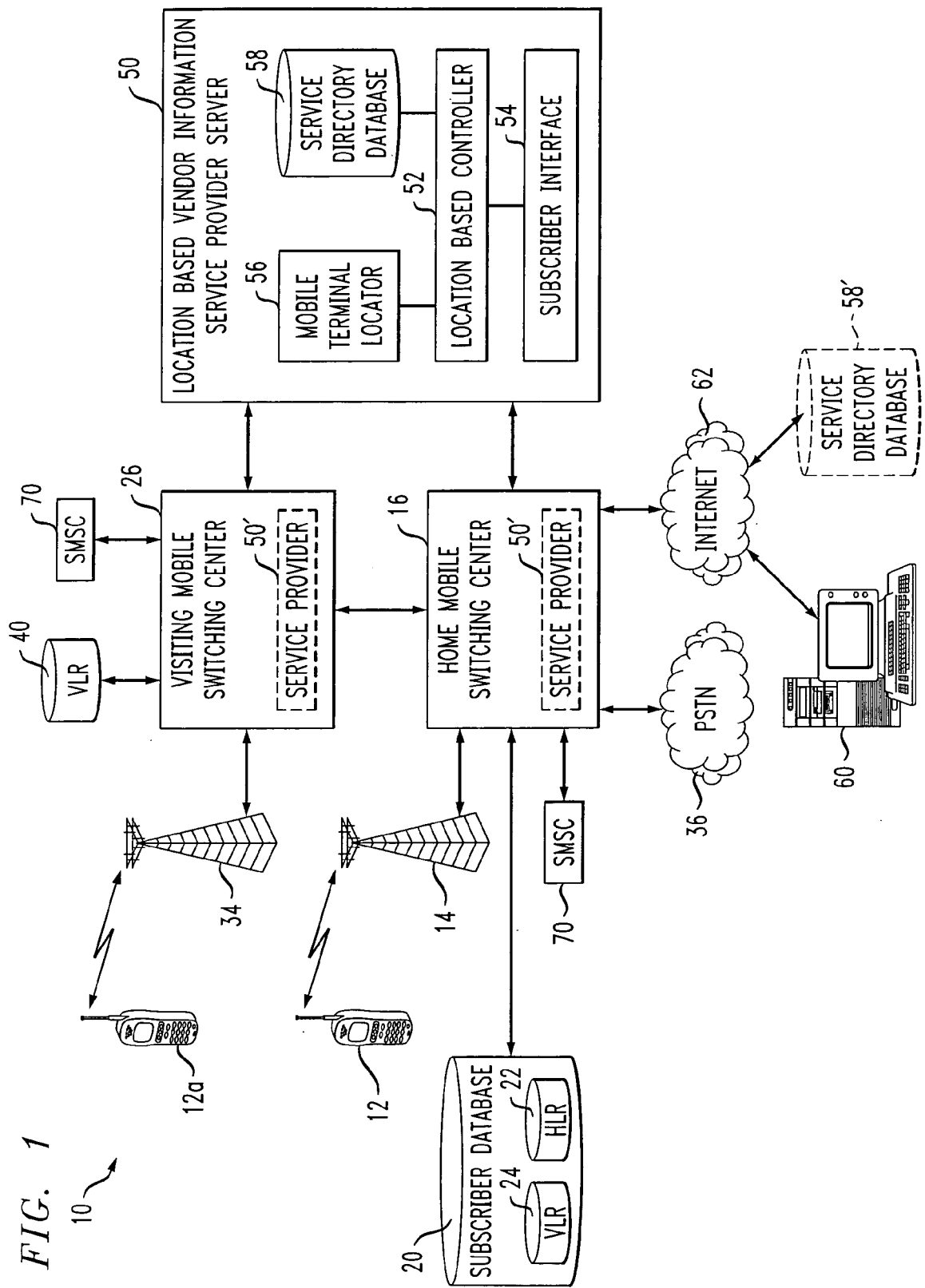
FIG. 1 is a block diagram illustrating a system for providing location based vendor information to a mobile terminal.

Referring now to the drawings wherein the showings are for purposes of illustrating the preferred embodiments of the invention only and not for purposes of limiting same, FIG. 1 provides a view of the overall preferred system according to the present invention. As shown, FIG. 1 includes a portion of a wireless telecommunications system shown generally at 10 for providing wireless telecommunications services to a party, referred to herein as a subscriber, using a wireless mobile terminal 12. The mobile terminal 12 is also known as a mobile phone, mobile handset, or cellular phone.

The wireless telecommunications network 10 includes a home base station 14 for providing over-the-air communications between the mobile terminal 12 and a Home Switching Center 16, such as a Home Mobile Switching Center (HMSC), enabling the mobile terminal to communicate with other terminals including wireless mobile terminals and Plain Old Telephone (POTS) terminals also known as landline telephones. The HMSC 16 controls call setups, registration, and call routing to/from the mobile terminal 12, among other functions when the terminal is in a geographic area considered as a home area, i.e. it is not roaming. The HSMC 16 is typically connected to a plurality of base stations 14 in the subscriber's home area, each of which is responsible for providing an area of coverage for over-the-air communications between the mobile terminals and the HMSC 16.

A subscriber database 20 is connected to the HMSC 16 for storing information associated with the subscriber and subscriber mobile terminal 12 such as subscription services including the location based vendor information service described herein. For example, the subscriber database includes subscriber provisioned response criteria for generating a response to a subscriber's request for location based vendor information as described in further detail below. The subscriber database 20 can include a Home Location Register 22 for storing subscriber information for subscribers associated with the HMSC 16. The subscriber database also includes a Visiting Location Register (VLR) 24 for storing subscriber information for subscribers visiting the HMSC 16, that is for roaming subscriber terminals serviced by the HMSC. The VLR 24 can be updated when the roaming subscriber terminal registers with the HMSC in a known manner.

The wireless telecommunications network 10 includes a plurality of Visiting Switching Centers, such as Visiting Mobile Switching Centers (VMSC) only one of which is shown for simplicity at 26, enabling the mobile terminal to communicate with other terminals over the wireless telecommunications network when the mobile terminal is in a geographic area not considered as a home area, i.e. when it is roaming. An example of the wireless mobile terminal roaming is shown as 12*a*.

The VMSC 26 controls call setups, registration, and call routing to/from the roaming mobile terminal 12*a*, among other functions, at locations remote from the home location described above. The VMSC 26 is typically connected to a plurality of base stations, only one of which is shown at 34, each covering a geographic area for providing over-the-air communications between the roaming mobile terminal 12*a* and the VMSC 26. The VMSC is connected to a subscriber database having a VLR 40 for storing at least portions of the subscriber information for the roaming subscriber mobile terminal 12*a*. This subscriber information is provided by the subscriber database 20 associated with the subscriber's HMSC 16 in a known manner during registration of the roaming mobile terminal with the VMSC 26.

The wireless telecommunications network 10 also includes a location based Service Provider server 50, referred to herein as the Service Provider, for providing the location based vendor information as described below. This server 50 can be a centralized server connected to each MSC, including the HMSC 16 and VMSC 26, for communication therewith. Alternatively, each MSC including both the HMSC 16 and the VMSC 26 can include the functionality provided by the Service Provider server 50 as shown by the dashed lines at 50'. The Service Provider 50 includes a controller 52 for controlling the Service Provider functionality as determined by suitable programming instructions and as a result can be referred to as the Service Provider.

The Service Provider 50 also includes a Subscriber Interface 54 for enabling subscribers to communicate with the Service Provider 50 to provide subscriber provisioned response criteria for generating a location based vendor information response as described in further detail below. Subscribers can contact the Subscriber Interface 54 by accessing a website using a computer 60 connected to the Service Provider via an Internet connection 62. Subscribers can also contact the Subscriber Interface 54 using a web accessible mobile terminal via the Internet connection 62.

The Service Provider 50 also includes a wireless mobile Terminal Locator 56 for determining the location of the mobile terminal, including when the mobile terminal is roaming 12*a*. The location of the mobile terminal 12*a* can be determined in any suitable known manner. For example, the mobile terminal's location can be determined by geographic coordinates provided by the wireless communications network 10 by estimating the distances to the nearest known base stations 34 as described by Chen et al. in U.S. Pat. No. 6,748,224 assigned to Lucent Technologies which is hereby totally incorporated by reference herein in its entirety. The mobile terminal's geolocation coordinates can also be provided to the Terminal Location 56 by the terminal itself 12*a*, such as by using the Global Positioning System (GPS). The GPS coordinates can be transmitted to the Terminal Locator 56 over the wireless communications network 10 so that the terminals location can be determined.

The Service Provider 50 also includes a Service Directory Database 58 for providing location based vendor information as requested by the subscriber for the subscriber's location as described below. The location based vendor information is stored in Service Directory Database 58 in any suitable manner in which it can be retrieved for any particular location, that location being the location of the subscriber's mobile terminal 12*a*. The location based vendor information stored in the Service Directory Database 58 can include vendors as identified by vendor identifiers, vendor contact information such as the street address, vendor phone number, website address, and travel direction information. The Service Directory Database 58 can be stored remotely from the Service Provider 50 as shown in dashed lines at 58' and the information can be provided to the Service Provider over a network connection, such as via the Internet 62 or in other suitable manners.

A Short Message Service Center 70 is connected to the HMSC 16 and the VMSC 26 for sending the response to the subscriber's request for location based vendor information in the form of a Short Message Service (SMS) message as described below, though it should be appreciated that this type of response is provided for the purposes of example and should not be considered limiting.

Figure 2:
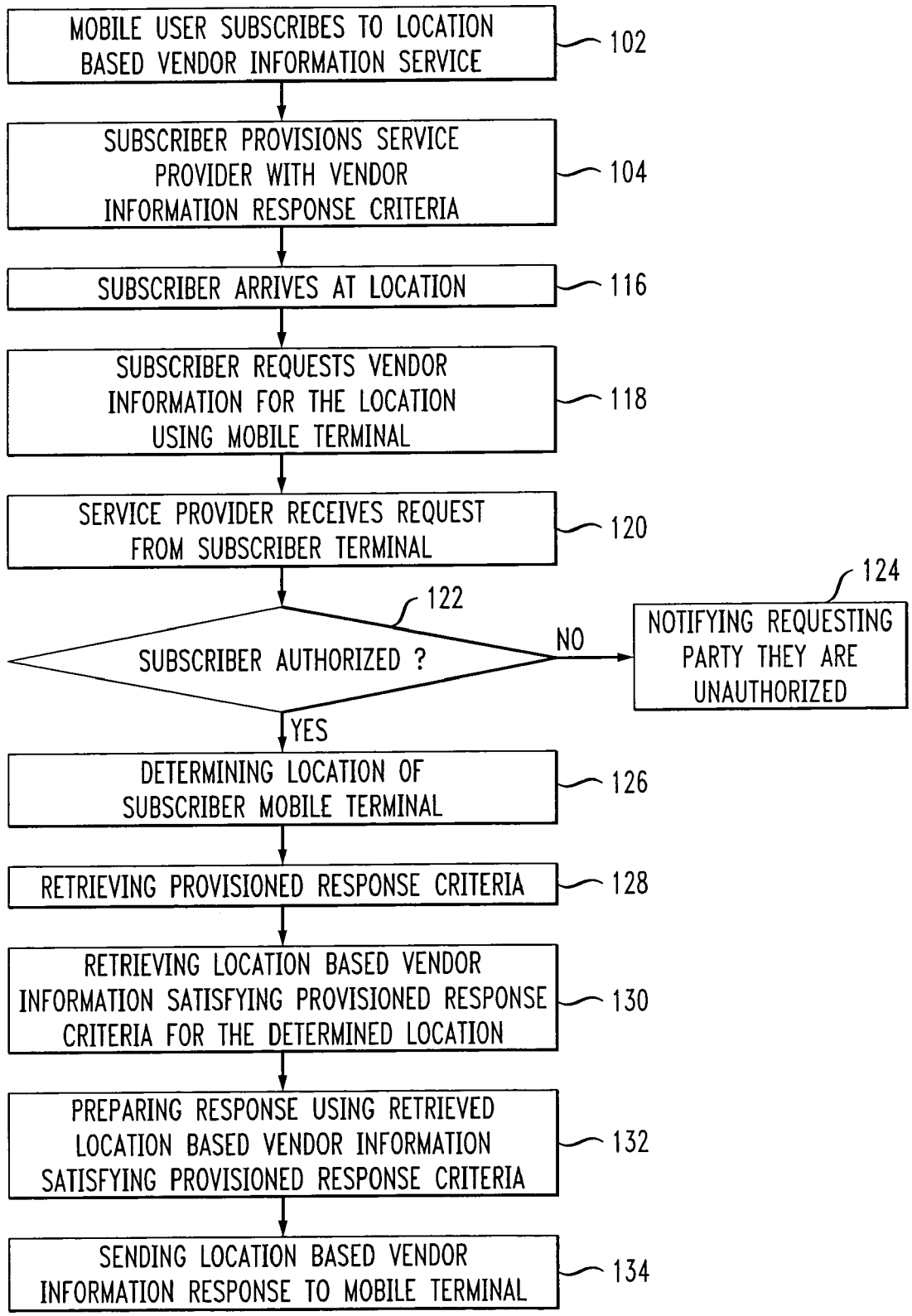
FIG. 2 is a flow chart illustrating the operation of the system of FIG. 1.

FIG. 2 is a flowchart of the operation of an illustrative embodiment of the present invention, wherein upon a subscriber's request, the location of a wireless mobile terminal 12*a* is determined and used to provide location based vendor information satisfying pre-established criteria provided by the subscriber at an earlier time.

The wireless mobile terminal user subscribes to the location based vendor information service at 102. This service is made available to the subscriber by the Service Provider 50. The Service Provider can also be a wireless telecommunications service provider, or it is contemplated that other parties can also be location based vendor information service providers. Information associating the subscription service features with the subscriber and subscriber terminal 12, 12*a*, such as by account number, or the phone number of the wireless mobile terminal is stored in the subscriber database 20.

The subscriber then provisions the Service Provider with vendor information response criteria at 104. An example by which the subscriber can provide this criteria is shown generally at 104 in FIG. 3. The subscriber contacts the Service Provider at 106, such as by contacting a website operated by the Service Provider 50, using a computer 60 connected to the Internet 62, or by using a wireless mobile terminal having Internet access, or in another manner suitable for providing vendor information response criteria. The subscriber provides desired vendor identifiers as response criteria identifying the vendors for which the subscriber would like to receive information at the location in which they submit their request as described below. The vendors can be vendors of products and/or services, examples of which can include but are not limited to, stores, restaurants, gas stations, etc. The vendor identifiers can be the names of these establishments. The Service Provider receives the vendor identifiers from the subscriber at 109.

The subscriber can also provide vendor contact parameters as response criteria at 110. Examples of the vendor contact parameters can include, but are not limited to, the location of the vendors, the street address of the vendors, the vendors' website addresses, the phone numbers of the vendors, and driving directions from the location at which the subscriber submits their request to the location of the vendors. The Service Provider receives the vendor contact parameters from the subscriber at 111.

The subscriber can also provide response format configuration criteria to the Service Provider at 112. This criteria can be used to configure the format in which the response to the subscriber's request for location based vendor information is prepared by the Service Provider. Examples of the response format configuration criteria can include ranking order which describes the order the vendor information, such as the vendor identifiers, are provided in the response. For example, the subscriber can have the response provide the vendors in an order of preference. The response format configuration criteria can also include grouping indicia used for grouping the vendor information in the response, such as according to the of product the vendor sells. For example, the subscriber can have the response group all fast food restaurants in the location together, then group all Indian food restaurants together, and then group all Chinese food restaurants together, etc. The response format configuration criteria can also include geographic ranking for providing the vendors in the order of their distance from the subscriber's location. The response format configuration criteria can also include a proximity limitations defining the size of the location, such as a radius of 10 city blocks or 10 miles from the mobile terminal 12a, etc. The Service provider 50 receives the response format configuration criteria from the subscriber at 113.

The Service Provider 50 stores the provisioned response criteria in association with the subscriber for future retrieval at 114, such as for example in the subscriber database 20.

By way of example, the subscriber provisions the response criteria to include all restaurants in the location as identified by their name and their location as given by their street address. The subscriber provisions the response criteria to include response format criteria that configures the response to a location based vendor information request to provide the information by listing it in order of the distance the restaurant is from the mobile terminal's location, with the closest restaurant being listed first, the next closest restaurant being listed next, etc.

Referring again to FIG. 2, at some future time, the subscriber travels and arrives at a location at step 116. The subscriber may be traveling for work or for pleasure and arrives at a location such as a city. In this example, the city of Chicago shall be used, though any city, town, or portion thereof, etc. can be a location.

The subscriber then requests vendor information for the location using the subscriber mobile terminal 12a at 118. In the example provided, the subscriber is requesting all the restaurants in Chicago listed in order of proximity. It should be noted that the subscriber can reduce the amount of information in the response by providing proximity limits such as a 10 block radius either in the provisioned criteria as described above or upon making the request or upon receiving at least portions of the response.

The subscriber can make a phone call to the Service Provider 50, via the VMSC 26, which can be accomplished easily using a programmed speed dial button or a predefined soft-key. The request is transmitted to the Service Provider Server 50 via the wireless network 10 and the Service Provider 50 receives the request at 120. For example, this response can be in the form of ANSI-41 type messaging or other messaging protocols.

The Service Provider controller 52 then determines if the subscriber is authorized to access the Service Provider 50 and receive a response to the location based vendor information request. The Service Provider 50 can determine if the subscriber is authorized by accessing the subscriber information in the Subscriber Database 20. If the Service Provider is located at the VMSC 26, rather in a centralized server connected to several MSCs, the Service Provide accesses the roaming subscriber's subscriber information stored in the VLR 40 provided from the subscriber database 20 during registration. If the party requesting location based vendor information is not an authorized subscriber, the Service Provider 50 notifies the requesting party that they are not authorized by sending a message to the terminal 12a in a known manner at 124.

If it is determined that the subscriber is authorized at 122, the Service Provider determines the location of the subscriber mobile terminal at 126. The location of the mobile terminal 12a can be determined as described above, or in other known manners.

The Service Provider 50 then retrieves the provisioned response criteria stored in step 114 described above. For example, the Service Provider controller 52 can retrieve the provisioned response criteria from the subscriber database 20 or from the VLR 40.

The Service Provider 50 then retrieves location based vendor information from the Service Directory Database 58 satisfying the provisioned response criteria for the subscriber terminal's location determined in step 126. The location based vendor information satisfies the response criteria by including the vendors as identified by the vendor identifiers, and the vendor information satisfying the vendor contact parameters and the response format configuration criteria as provided by the subscriber when provisioning the response criteria in step 104 above. This vendor information is retrieved for the location of the subscriber's terminal 12a and is thus referred to as location based vendor information. As stated above, if desired, the subscriber can determine the size of the location, such as the radius, as provided by the provisioned response criteria.

The Service Provider 50 then prepares a response to the subscriber's location based vendor information request which satisfies the provisioned response criteria, such as for example, the response format configuration criteria provided in step 112 above. Therefore, the response groups the vendors found in that location according to the subscribers desired groupings, orders the vendors found in that location in the order desired by the subscriber, etc. The response can be in the form of an SMS message sent by the SMSC 70 or in any other known message format suitable for providing the location based vendor information to the subscriber mobile terminal 12a. The Service Provider 50 then sends the location based vendor information response to the subscriber's mobile terminal 12*a* at 134 via the SMSC 70 providing the requested location based vendor information to the subscriber.

In this manner, the subscriber can travel freely and always obtain the vendor information for their location in a manner which they desire. The location based vendor information Service Provider 50 enables to subscriber to customize the type of vendor information they receive for their location, and the manner in which they receive it. The locations traveled to do not need to be anticipated by the subscriber. The location response criteria pre-provisioned by the subscriber is generic as to location and can be applied to any location and still provide the kind of location based information the subscriber desires.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method comprising:
   receiving subscriber provisioned response criteria from a subscriber for generating a location based vendor information response;
   storing the subscriber provisioned response criteria;
   receiving a request for location based vendor information from a subscriber mobile terminal at a locaton;
   determining the location of the subscriber mobile terminal upon receiving the request;
   retrieving the stored subscriber provisioned response criteria upon receiving the request;
   retrieving location based vendor information satisfying the subscriber provisioned response criteria for the determined subcriber mobile terminal location upon receiving the request;
   preparing a response upon receiving the request including the location based vendor information satisfying the subscriber provisioned response criteria; and
   sending the response to the subscriber mobile terminal.

2. The method defined in claim 1 wherein the step of receiving the subscriber provisioned response criteria comprises receiving vendor identifiers from the subscriber.

3. The method defined in claim 1 wherein the step of receiving the subscriber provisioned response criteria comprises receiving vendor contact parameters from the subscriber.

4. The method defined in claim 3 wherein the vendor contact parameters comprise at least one of street address, phone number, and travel directions to the street address from the location of the subscriber mobile terminal.

5. The method defined in claim 1 wherein the step of receiving the subscriber provisioned response criteria comprises receiving response format configuration criteria.

6. The method defined in claim 5 wherein the response format configuration criteria comprises ranking order describing the order of the vendor information in the response.

7. The method defined in claim 5 wherein the response format configuration criteria comprises grouping information for grouping the vendor information according to vendor type.

8. The method defined in claim 5 wherein the response format configuration criteria comprises geographic ranking for providing the vendors in the order of their distance from the subscriber mobile terminal.

9. A system for providing location based vendor information to a mobile terminal comprising:
   means for receiving subscriber provisioned response criteria from a subscriber for generating a location based vendor information response;
   means for storing the subscriber provisioned response criteria;
   means for receiving a request at a location for location based vendor information from a subscriber mobile terminal;
   means for determining the location of the subscriber mobile terminal upon receiving the request;
   means for retrieving the stored subscriber provisioned response criteria upon receiving the request;
   means for retrieving location based vendor information satisfying the subscriber provisioned response criteria for the determined subscriber mobile terminal location upon receiving the request;
   means for preparing a response upon receiving the request including the location based vendor information satisfying the subscriber provisioned response criteria; and
   means for sending the response to the subscriber mobile terminal.

* * * * *